US006649055B1

(12) United States Patent
Whitton et al.

(10) Patent No.: US 6,649,055 B1
(45) Date of Patent: Nov. 18, 2003

(54) PUMP STATION FOR RADIOACTIVE WASTE WATER

(75) Inventors: John P. Whitton, Ballston Lake, NY (US); Dean M. Klos, Venetia, PA (US); Danny T. Carrara, Saratoga Springs, NY (US); John J. Minno, Ballston Spa, NY (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 10/139,288

(22) Filed: May 7, 2002

(51) Int. Cl.[7] ............................ B01D 35/02; F03B 7/00

(52) U.S. Cl. ........................... 210/258; 52/192; 96/219; 137/343; 210/86; 415/200; 588/20

(58) Field of Search .......................... 210/86, 258, 416, 210/1–416.5; 96/219; 415/89, 200; 417/360; 420/8, 43; 29/888.024, 889; 588/20; 137/343; 52/192

(56) References Cited

U.S. PATENT DOCUMENTS

| | | | | | |
|---|---|---|---|---|---|
| 4,160,734 | A | * | 7/1979 | Taylor et al. | 210/258 |
| 4,844,276 | A | | 7/1989 | Kunze et al. | |
| 4,969,926 | A | * | 11/1990 | Sewter et al. | |
| 5,035,811 | A | * | 7/1991 | Grondin et al. | 210/416.1 |
| 5,307,389 | A | | 4/1994 | Meneely et al. | |
| 6,406,635 | B1 | * | 6/2002 | Smith et al. | 210/258 |

* cited by examiner

*Primary Examiner*—Joseph Drodge
(74) *Attorney, Agent, or Firm*—Richard A. Morgan; Paul A. Gottlieb

(57) ABSTRACT

A pump station for transferring radioactive particle containing waste water, includes: (a.) an enclosed sump having a vertically elongated right frusto conical wall surface and a bottom surface and (b.) a submersible volute centrifugal pump having a horizontally rotating impeller and a volute exterior surface. The sump interior surface, the bottom surface and the volute exterior surface are made of stainless steel having a 30 Ra or finer surface finish. A 15 Ra finish has been found to be most cost effective. The pump station is used for transferring waste water, without accumulation of radioactive fines.

18 Claims, 1 Drawing Sheet

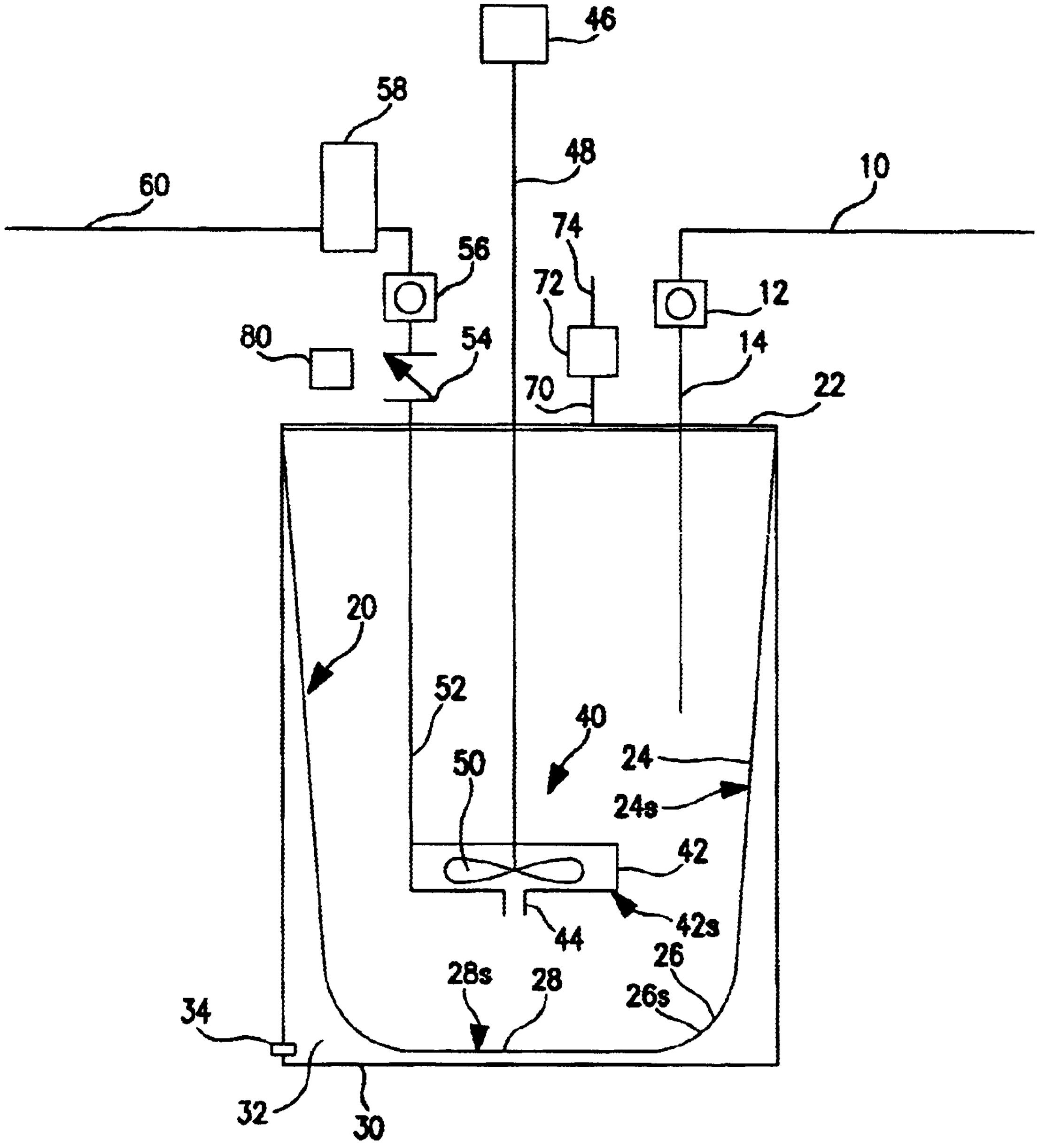
46
58
48
60
10
74
56
72
12
80
54
14
70
22
20
52
40
50
24
24s
42
42s
44
26
28s
28
26s
34
32
30

PUMP STATION FOR RADIOACTIVE WASTE WATER

STATEMENT REGARDING FEDERALLY SPONSORED RESEARCH OR DEVELOPMENT

The invention was conceived and made in the course of or under a contract with the U.S. Department of Energy.

BACKGROUND OF THE INVENTION

1. Field of the Invention

The invention relates to a decontamination apparatus for treating radioactive contaminated material. More particularly, the invention relates to an apparatus for treating or disposing of liquid waste. Most particularly the invention relates to containment of liquid waste in a tank or other container.

2. Discussion of the Related Art

The invention is an apparatus for the collection, transport and processing of waste water containing radioactive contaminants. The radioactive contaminants include micron size organic and inorganic particles including micron size particles or fines, such as dust, water treating resin, sludge, bacterial growth and any other material that may contaminate process water in and around a nuclear laboratory or plant. All these particles are referred to generically as radioactively contaminated material. This material may be soluble or somewhat soluble in water. More troublesome contaminants include small particles of insoluble radioactive material that have a relatively high surface area to weight ratio. Such contaminants are carried along in flowing waste water. They also easily adhere to surfaces, and settle out in corners, crevices and other low flow velocity sites.

Because of the hazards associated with radioactive contaminated waste water, it is often undesirable to dispose of it. Instead, the waste water is processed and recycled for reuse. Processing includes settling, filtering, demineralizing, sterilizing and the like.

One means for collecting waste water containing radioactive contaminants is a pump station. U.S. Pat. No. 5,307,389 to T. K. Meneely et al. discloses a pump station including a diaphragm pump in a cylindrical collection tank. The tank is used to collect waste water before passing it along to be demineralized, sterilized and reused.

Prior means for collecting waste water are also known for their propensity to collect and retain deposits of radioactive particles over time. Deposits occur in the bottom corners of the stainless steel collection tank and in downstream piping, particularly at joints, crevices and at rough surfaces. Depositing of radioactive particles is the primary cause of a gradual increase in radiation levels in a waste water system. This has the potential for contaminating an entire system over time. U.S. Pat. No. 4,844,276 to Kunze et al. discloses a vessel for receiving an aqueous suspension containing radioactive solids. Another waste water sump has a vertically oriented 30-gallon stainless steel drum. The vertical drum walls were not filleted to the drum bottom, nor were contact surfaces polished.

There is a need in the art for a pump station for radioactive contaminated waste water, which is not susceptible to the deposition of radioactive particles.

SUMMARY OF THE INVENTION

The invention is a pump station for transferring radioactive particle-containing waste water. The pump station includes an enclosed sump and a pump. The enclosed sump has a vertically elongated, generally frusto conical interior surface and a bottom surface. The pump is a submersible volute centrifugal pump. The volute has a volute exterior surface and a volute inlet providing entry to an impeller that rotates in the horizontal plane. The volute exterior surface, the sump interior surface and the bottom surface are all made of stainless steel having a 30 Ra or finer finish.

BRIEF DESCRIPTION OF THE DRAWING

The Drawing is a schematic cross-sectional view showing a pump station of the invention.

DETAILED DESCRIPTION OF THE INVENTION

Reference is made to the Drawing, which shows a pump station of the invention particularly adapted for transferring waste water containing radioactive particles. Waste water enters the pump station via waste water inlet line 10 and first ball valve 12. Inlet line 10 carries waste water and discharges downwardly via dip line 14 into a first sump 20. The downward directing orientation of dip line 14 prevents liquids and solids from splashing into the air space of the first sump 20. By design, a liquid level is established in the sump 20. Extending the dip line 14 below the lower liquid level eliminates the generation of water, organic and inorganic vapors. It also keeps particles suspended in the waste water.

Materials of construction for the inlet line 10, first ball valve 12 and dip line 14 will depend on the type of contaminants in the waste water; requirements regarding corrosion resistance; and requirements for compressive strength, tensile strength and thermal stress.

First sump 20 is fully enclosed with enclosing cover 22 and any liquid and vapor therein cannot escape from the sump 20 to the atmosphere. Liquid from first sump 20 exits via sump outlet line 60. Vapor that does not flow through sump outlet line 60 leaves via sump vent line 70. Although it is not intended that any waste water should leak from first sump 20, any leakage is captured in the cavity 32 between first sump 20 and second enclosed containment sump 30 and recovered. Any such leakage captured in the cavity 32 is detected visually or by an automated detector (not shown) and removed via inspection plug 34.

First sump 20 is vertically elongated with enclosing cover 22 and has a generally frusto conical sump wall 24 extending from enclosing cover 22 to sump bottom 28. The sump wall 24 has a surface 24*s*. Likewise the sump bottom 28 has a surface 28*s*. Sump bottom 28 is disk shaped and dished, i.e. convex or hemispherical. Sump bottom 28 truncates sump wall 24, making the wall frusto conical. The frusto conical sump wall 24 is generally right circular cone shaped. The right circular cone is truncated at about 10% to 50%, typically 20 to 40% of a theoretical untruncated height.

The attachment of sump bottom 28 to sump wall 24 is by arcuate joint 26 having arcuate joint surface 26*s*. The joint 26 is smoothly arched, filleted or smoothly concave. As a result, there is no corner or crevice to stop and hold particles. Any particles continue flowing through the sump 20 with the waste water flow.

The materials of construction of the sump wall 24, arcuate joint 26 and sump bottom 28 include stainless steel, nickel, high nickel alloys, and titanium. American Iron and Steel Institute (AISI) type 301, type 304, type 316 and type 316L stainless steel are preferred. AISI type 304 stainless steel is most preferred because of the particularly smooth finish that can be applied to it, and it is cost effective.

Pump 40 is a submersible, volute centrifugal pump. Pump 40 has a volute 42 that contains a horizontally rotating pump impeller 50. Waste water enters volute 42 via volute inlet 44. Volute inlet 44 provides for flow of waste water into the volute 42 where it contacts impeller 50 rotating in the horizontal plane. The horizontally rotating impeller draws waste water into the volute creating a vortex in the sump and scouring surfaces in the sump.

The exterior surface of the volute is indicated by volute exterior surface 42*s*. The pump is driven by electric motor 46 by way of pump shaft 48 attached to impeller 50. Pump shaft 48 is highly polished. Electric motor 46 is located external to the sump above enclosing cover 22. Materials of construction of the volute 42 are the same as those for the sump wall 24 and sump bottom 28.

The sump wall surface 24*s*, arcuate joint surface 26*s*, sump bottom surface 28*s* and pump volute exterior surface 42*s* are each polished or otherwise smoothed to a finish of 30 Ra (micro inches) or finer, preferably 15 Ra (micro inches) or finer. Surface polishing is quantified by a Polish Number, a grit size or by the root mean average surface profile (Ra). Root mean average surface profile (Ra) is quantified in micro inches ($10^{-6}$ inches).

The stainless steel is usually ordered to ASTM A 270 specification. The commercially received stainless steel requires a mechanical polishing or electropolishing regardless of the existing surface smoothness.

Mechanical polishing takes one of two forms, swirl polishing and longitudinal belt polishing. Swirl polishing uses a rotating flapper wheel that moves up and down the length of the stainless steel surface removing only a thin surface layer of material, creating a "smeared surface". Longitudinal belt polishing uses an abrasive belt that moves along the length of the stainless steel surface with the application of light pressure. The technique removes a measurable amount of material (0.0006 to 0.0008 inch, 0.015 to 0.020 mm). Both methods remove the deep passive layer that is formed during manufacture of the stainless steel sheet from which the sump wall 24, arcuate joint 26, sump bottom 28 and volute 42 are made. The result is the highly polished sump wall surface 24*s*, arcuate joint surface 26*s*, sump bottom surface 28*s* and volute exterior surface 42*s*.

TABLE 1

| | Surface Finish | |
|---|---|---|
| Polish Number | Equivalent Grit Size | Root Mean Averaqe Surface Profile |
| No. 3 | 120 Grit | 40–50 Ra (micro inches) |
| No. 4 | 180 Grit | 15–30 Ra (micro inches) |
| No. 6 | 240 Grit | 10–15 Ra (micro inches) |
| No. 7 | 320 Grit | less than 10 Ra (micro inches) |

Coarse Grit Size 14 to 36
Medium Grit Size 46 to 150
Fine Grit Size 220 to 900

In a conventional electropolishing process the work piece is immersed in an aqueous bath containing an electrolyte such as acid and water, e.g. phosphoric acid and water. The bath is contained in a non-conductive vessel having sufficient capacity to contain both the aqueous bath and work piece. Two electrodes of opposite polarity are immersed in the bath and a current is conducted from the anodic electrode, through the metal work piece to the cathodic electrode. The work piece is typically in direct physical contact with the anodic electrode. The passage of current through the bath results in the removal of metal from the exterior surface of the work piece, especially at sharp surfaces or irregular surfaces. Electropolishing can be described as the reverse of electroplating. That is, in electropolishing, metal is electrochemically removed from the work piece surface, while in electroplating, metal is electrochemically deposited on the work piece surface.

Inventors have found that economically advantageous results are achieved at the transition between nominal coarse grit and nominal fine grit. This transition is at 30 Ra, preferably 15 Ra surface finish. The horizontally rotating impeller 50 creates a waste water vortex in the right circular cone that scours sump wall surface 24*s*. At the specified surface finish, sump wall surface 24*s* remains free of all particles and fines. Arcuate joint surface 26*s* and sump bottom surface 28*s* also remain free of all particles and fines. The vortex is strong enough to leave volute exterior surface 42*s* free of particles and fines.

Waste water is drawn into volute 42 via volute inlet 44 and pressured by means of impeller 50 out of the volute through pump discharge line 52, check valve 54, second ball valve 56, micron filter 58 and outlet line 60, out of the pump station.

Micron filter 58 is preferably a bag filter, paper filter, cartridge filter or carbon filter. These filters are all commercially available for removing fines from water. The filter element may be folded paper of a precise porosity that passes water and captures micron size fines. The porosity of commercially available filter paper is extremely uniform and therefore, the size of the minimum size particle that can be captured by the filter is specifiable. For purposes of the invention, it is desirable to capture all particles of 5 to 10 micron or greater size, preferable particles of 1 micron or greater size, most preferably 0.5 micron or greater size particles. It has been found through experience, that a 10.0 micron filter will capture essentially all radioactive particles. The result is a waste water stream that consistently demonstrates no measurable radioactivity.

Micron filter 58 is a commercially available filter or the equivalent for removing particles from waste water. The micron filter consists of a filter element within a filter housing and is connected to the pump station piping via fittings that allow changing the filter. Fittings known as quick disconnect fittings are known for this purpose. The filter element may be made of paper, polyethylene, nylon, polyester or an equivalent material used for this purpose. Bag filters and paper filters are commercially available having a precise porosity that passes water and captures micron size particles. The porosity of commercially available filter elements is extremely uniform. Therefore the size of the minimum size particle that will be captured is a matter of filter element selection.

Bag filters, paper filters, cartridge filters and carbon filters are commercially available. One carbon filter is the Osmonics AC36P™ filter.

The waste water effluent coming from micron filter 58 is routinely tested for radioactivity. It has been found that any indication of radioactivity coming from a 5 or 10 micron filter can be remedied by replacing the filter element with a fresh element. If refreshing the element does not yield a radioactivity free waste water, the filter element should be changed to a finer mesh filter element, e.g. a 1 micron or 0.5 micron filter. Any indication of radioactivity from a 0.5 micron filter is remedied by renewing the filter element. That is, filter elements finer than 0.5 micron have been found to be unnecessary to achieve a radioactivity free waste water effluent.

Sump vent line 70 traverses enclosing cover 22 to provide for the removal of any gas or vapor. When the sump is emptied of waste water, the internal volume fills with ambient air. The air is discharged from the sump on refilling with waste water. Discharged air may carry fines, such as dust particles that are captured by high efficiency particulate filter (HEPA) 72. A particle free gas or vapor is withdrawn via vent outlet line 74.

High efficiency particulate filters (HEPA) are commercially available that are 99.9% plus efficient. The filter media may be charcoal or activated charcoal as disclosed in U.S. Pat. No. 6,174,341 incorporated herein by reference. Two stage HEPA filters are known that have a first filter of paper or mini pleat fiberglass, followed by a second filter element of activated carbon filter for removal of all remaining particles.

The waste water liquid level (not shown) in first sump 20 is detected by means of a non-invasive level detector 80. The level detector is an ultrasonic level detector or a non-invasive equivalent. The level detector should be external to first sump 20. A level detector, which contacts a waste water, accumulates particles and has to be periodically cleaned. It is undesirable to have a detector contact radioactive particle containing waste water. Inventors have found that an ultrasonic detector positioned external to the sump 20 functions entirely adequately.

The ultrasonic signal beam from the level detector can be reduced in size by adding a plastic focusing pipe at the top flanged nozzle connection traversing enclosing cover 22. Reducing the size of the beam is necessitated by the smaller sump bottom provided by the truncated conical shape of the sump.

The pump volute should be positioned in the sump close to the bottom to maximize inlet velocity in order to maintain particles in suspension. The pump volute is preferably about 3 to 6 inches from the bottom of the sump.

Waste water enters sump 20 and accumulates until it reaches a predetermined upper level. At this predetermined level, a control signal is sent to an electrical switch (not shown), actuating motor 46. The pumping action of pump 40 in the right frusto conical shaped sump induces a circular motion, i.e. vortex that scours the polished sump surface 24*s*. For design purposes, waste water velocity at the polished sump surface 24*s* should be about 2 to 6 feet per second. Waste water carries the fines into pump volute 42 and out of the sump via discharge line 52. The waste water flows via check valve 54 that prevents back flow into the sump. Ball valve 56 is present to isolate the pump station from a disposal system or recycle system downstream when out of service. At a predetermined lower level, motor 46 is shut off. The predetermined lower level is above pump volute 42.

A complete system comprises a pair of pump stations with piping providing operation in parallel. Pipe and valves are provided at the inlet and outlet of each pump station connecting them hydraulically. Either pump station can be hydraulically isolated from the other. Isolation valves, often a pair of gate valves with a bleed for sampling between them, are provided for this purpose. It was found that a balancing or connector pipe provided significant cleaning as water flowed from one pump station to the other. The discharge point of the line is below the water surface and pump volute. It is recommended that the balancing line between the two sumps enter each sump tangentially. This forces water into the sump in the direction of vortex flow. The vortex is not hindered and in fact scouring of the sump wall is enhanced.

A lighted sight glass is provided for inspection of each sump for any particles that might adhere to dry internal surfaces.

TABLE 2

| Elements in the Drawing | |
|---|---|
| 10 | waste water inlet line |
| 12 | first ball valve |
| 14 | dip line |
| 20 | first sump |
| 22 | enclosing cover |
| 24 | sump wall |
| 24s | sump wall surface |
| 26 | arcuate joint |
| 26s | arcuate joint surface |
| 28 | sump bottom |
| 28s | sump bottom surface |
| 30 | second enclosed containment sump |
| 32 | cavity |
| 34 | inspection plug |
| 40 | volute centrifugal pump |
| 42 | volute |
| 42s | volute exterior surface |
| 44 | volute inlet |
| 46 | motor |
| 48 | pump shaft |
| 50 | pump impeller |
| 52 | pump discharge line |
| 54 | check valve |
| 56 | second ball valve |
| 58 | micron filter |
| 60 | sump outlet line |
| 70 | sump vent line |
| 72 | high efficiency particulate filter (HEPA) |
| 74 | vent outlet line |
| 80 | level detector |

The foregoing discussion discloses and describes embodiments of the present invention by way of example. One skilled in the art will readily recognize from this discussion and from the accompanying drawings and claims, that various changes, modifications and variations can be made therein without departing from the spirit and scope of the invention as defined in the following claims.

What is claimed is:

1. A pump station for transferring radioactive particle containing waste water, including:

a. an enclosed sump having:
   i. a vertically elongated generally frusto conical wall having a sump interior surface arcuately joined to
   ii. a bottom surface, the enclosed sump containing:
b. a submersible volute centrifugal pump having:
   i. a volute having a volute exterior surface and a volute inlet providing entry to
   ii. a horizontally rotating impeller, the sump interior surface, the bottom surface and the volute exterior surface having a 30 Ra or finer surface finish.

2. The pump station of claim 1 wherein the sump interior surface, the bottom surface and the volute exterior surface are made of a metal selected from the group consisting of stainless steel, nickel, high nickel alloy and titanium.

3. The pump station of claim 1 wherein the sump interior surface, the bottom surface and the volute exterior surface are stainless steel.

4. The pump station of claim 1 wherein the volute exterior surface, the sump interior surface and the bottom surface are made of a stainless steel having a 15 Ra or finer surface finish.

5. The pump station of claim 1 wherein the frusto conical wall is a right frusto conical wall.

6. The pump station of claim 1 wherein clearance between the volute and the bottom surface is about 3 to 6 inches.

7. A pump station for transferring radioactive particle containing waste water, including:

a. an enclosed first sump having:
   i. a vertically elongated generally frusto conical wall having a sump interior surface arcuately joined to
   ii. a bottom surface, b. a submersible volute centrifugal pump contained in the enclosed sump, the volute centrifugal pump having:
   i. a volute having a volute exterior surface and a volute inlet providing entry to
   ii. a horizontally rotating impeller, c. a second containment sump enclosing the first sump, d. first sump outlet conduits including:
   i. a pump discharge conduit having a 10 micron or finer filter, and
   ii. a vapor vent conduit having a particulate filter, the sump interior surface, the bottom surface and the volute exterior surface having a 30 Ra or finer surface finish.

8. The pump station of claim 7 wherein the sump interior surface, the bottom surface and the volute exterior surface are made of a metal selected from the group consisting of stainless steel, nickel, high nickel alloy and titanium.

9. The pump station of claim 7 wherein the sump interior surface, the bottom surface and the volute exterior surface are stainless steel.

10. The pump station of claim 7 wherein the sump interior surface, the bottom surface and the volute exterior surface are stainless steel having a 15 Ra or finer surface finish.

11. The pump station of claim 7 additionally including a waste water level detector external to the first sump.

12. The pump station of claim 7 additionally including an ultrasonic waste water level detector external to the first sump.

13. The pump station of claim 7 additionally including a waste water inlet conduit positioned for discharging downwardly, toward the bottom surface.

14. The pump station of claim 7 wherein the frusto conical wall is right frusto conical.

15. The pump station of claim 7 wherein clearance between the volute and the bottom surface is about 3 to 6 inches.

16. A pump station for transferring radioactive particle containing waste water, including:

a. an enclosed sump having:
   i. a vertically elongated generally frusto conical wall having a sump interior surface arcuately joined to
   ii. a bottom surface, the enclosed sump containing:

b. a submersible volute centrifugal pump having a horizontally rotating impeller, the sump interior surface and the bottom surface made of a stainless steel having a 30 Ra or finer surface finish.

17. The pump station of claim 16 wherein the sump interior surface and the bottom surface are stainless steel having a 15 Ra or finer surface finish.

18. The pump station of claim 16 wherein clearance between the volute and the bottom surface is about 3 to 6 inches.

* * * * *